(12) United States Patent
Dasari et al.

(10) Patent No.: US 8,478,923 B2
(45) Date of Patent: Jul. 2, 2013

(54) INTERRUPT SUPPRESSION BY PROCESSING JUST FIRST INTERRUPT OF A SAME TYPE

(75) Inventors: Shiva Dasari, Austin, TX (US); Suresh Lavani, Austin, TX (US); Newton P. Liu, Austin, TX (US); Thanh Nguyen, Austin, TX (US); Mehul Shah, Austin, TX (US); Robert K. Sloan, Pflugerville, TX (US); Wingcheung Tam, Austin, TX (US); Mark W. Wenning, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 12/890,648

(22) Filed: Sep. 25, 2010

(65) Prior Publication Data

US 2012/0079256 A1    Mar. 29, 2012

(51) Int. Cl.
*G06F 13/24* (2006.01)
(52) U.S. Cl.
CPC .................................... *G06F 13/24* (2013.01)
USPC ............................ 710/266; 710/268; 710/260
(58) Field of Classification Search
USPC ................................................ 710/260–269
See application file for complete search history.

(56) References Cited

U.S. PATENT DOCUMENTS

| | | | |
|---|---|---|---|
| 5,764,999 A | 6/1998 | Wilcox et al. | |
| 6,397,283 B1 * | 5/2002 | Ting | 710/260 |
| 6,434,651 B1 * | 8/2002 | Gentry, Jr. | 710/260 |
| 6,442,634 B2 * | 8/2002 | Bronson et al. | 710/260 |
| 6,633,942 B1 * | 10/2003 | Balasubramanian | 710/264 |
| 6,931,553 B1 * | 8/2005 | Plante et al. | 713/310 |
| 6,961,879 B1 | 11/2005 | Jen | |
| 6,993,613 B2 * | 1/2006 | Connor et al. | 710/260 |
| 7,080,179 B1 * | 7/2006 | He et al. | 710/269 |
| 7,219,241 B2 | 5/2007 | Cooper et al. | |
| 7,350,007 B2 | 3/2008 | Depew et al. | |
| 2004/0107369 A1 | 6/2004 | Cooper et al. | |
| 2005/0182879 A1 * | 8/2005 | Vu | 710/260 |
| 2005/0246465 A1 * | 11/2005 | Wright et al. | 710/260 |
| 2005/0268016 A1 * | 12/2005 | Mowry et al. | 710/260 |
| 2007/0198759 A1 * | 8/2007 | Agarwal | 710/260 |
| 2008/0140895 A1 * | 6/2008 | Baker et al. | 710/262 |
| 2009/0089470 A1 * | 4/2009 | Ven | 710/260 |
| 2010/0070669 A1 * | 3/2010 | Johnson et al. | 710/264 |
| 2011/0320664 A1 * | 12/2011 | Belmar et al. | 710/269 |

FOREIGN PATENT DOCUMENTS

| | | |
|---|---|---|
| EP | 0768603 B1 | 8/2002 |
| JP | 2002185567 A2 | 6/2002 |
| WO | 2004051461 A3 | 6/2004 |

* cited by examiner

*Primary Examiner* — Raymond Phan
(74) *Attorney, Agent, or Firm* — Thomas Tyson

(57) ABSTRACT

A processor receives interrupts of a same type from hardware. The processor determines a rate at which the interrupts are being received. The processor compares the rate at which the interrupts are being received to a threshold rate. In response to determining that the rate at which the interrupts are being received is greater than the threshold rate, the processor sends just the first received interrupt to firmware for processing. All other of the interrupts are not sent from the processor to the firmware but instead are suppressed by the processor. By comparison, in response to determining that the rate at which the interrupts are being received is less than the threshold rate, the processor can send all the interrupts from the processor to firmware for processing.

17 Claims, 2 Drawing Sheets

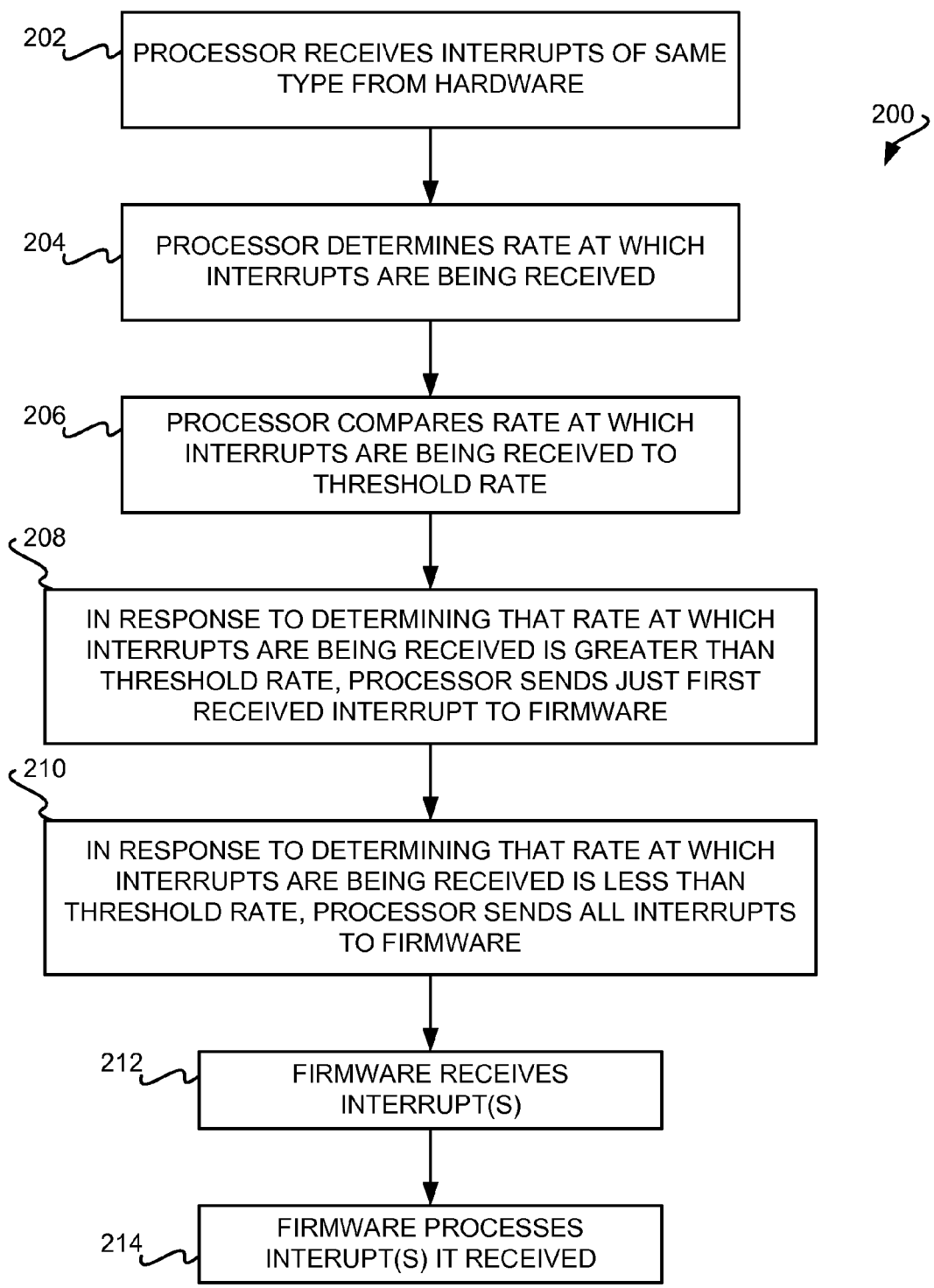

INTERRUPT SUPPRESSION BY PROCESSING JUST FIRST INTERRUPT OF A SAME TYPE

BACKGROUND

An interrupt is a signal sent from hardware to a processor when the hardware has detected a condition that requires attention. An interrupt can take priority over other tasks being executed by the processor, such as tasks being executed by the processor as directed by an operating system or by a computer program running on the operating system. One type of interrupt is a system management interrupt (SMI), which is generated by hardware and sent to the processor, which then sends the SMI to firmware for immediate processing. For example, hardware such as a volatile memory controller may send an SMI to the processor when the controller detects a correctable or uncorrectable memory error. The firmware is a computer program stored on a non-volatile memory, and which is responsible for performing low-level tasks to ensure the proper running of a computing system. An example of firmware is a basic input/output system (BIOS), which is also responsible for the booting of the computing system.

SUMMARY OF THE INVENTION

A method of an embodiment of the invention includes receiving, by a processor from hardware, interrupts of a same type. The method includes determining, by the processor, a rate at which the interrupts are being received at the processor. The method includes comparing the rate at which the interrupts are being received to a threshold rate. The method includes, in response to determining that the rate at which the interrupts are being received is greater than the threshold rate, sending just a first received interrupt of the interrupts from the processor to firmware for processing by the firmware. As such, all other of the interrupts are not sent from the processor to the firmware but instead are suppressed by the processor.

A computer program product of a processor of an embodiment of the invention includes a computer-readable storage medium that is part of the processor and that has computer-readable code embodied therein, where the computer-readable code is internally executable by the processor. The computer-readable code includes first computer-readable code to receive from hardware interrupts of a same type. The computer-readable code includes second computer-readable code to determine a rate at which the interrupts are being received at the processor. The computer-readable code includes third computer-readable code to compare the rate at which the interrupts are being received to a threshold rate. The computer-readable code includes fourth computer-readable code to, where the rate at which the interrupts are being received is greater than the threshold rate, send just a first receive interrupt of the interrupts from the processor to firmware for processing by the firmware. As such, all other of the interrupts are not sent from the processor to the firmware but instead are suppressed by the processor.

A computing system of an embodiment of the invention includes firmware, hardware, and a processor. The hardware is to generate interrupts of a same type. The processor is to receive the interrupts, to determine the rate at which the interrupts are being received, and to compare the rate at which the interrupts are being received to a threshold rate. In a given operational mode, the processor is to, where the rate at which the interrupts are being received is greater than the threshold rate, send just the first received interrupt of the interrupts to the firmware for processing by the firmware. As such, all other of the interrupts are not sent from the processor to the firmware but instead are suppressed by the processor.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2 is a flowchart of a method in which interrupts of the same type are suppressed by a processor after a first such interrupt is sent from the processor to firmware, according to an embodiment of the invention.

DETAILED DESCRIPTION

Figure 1:
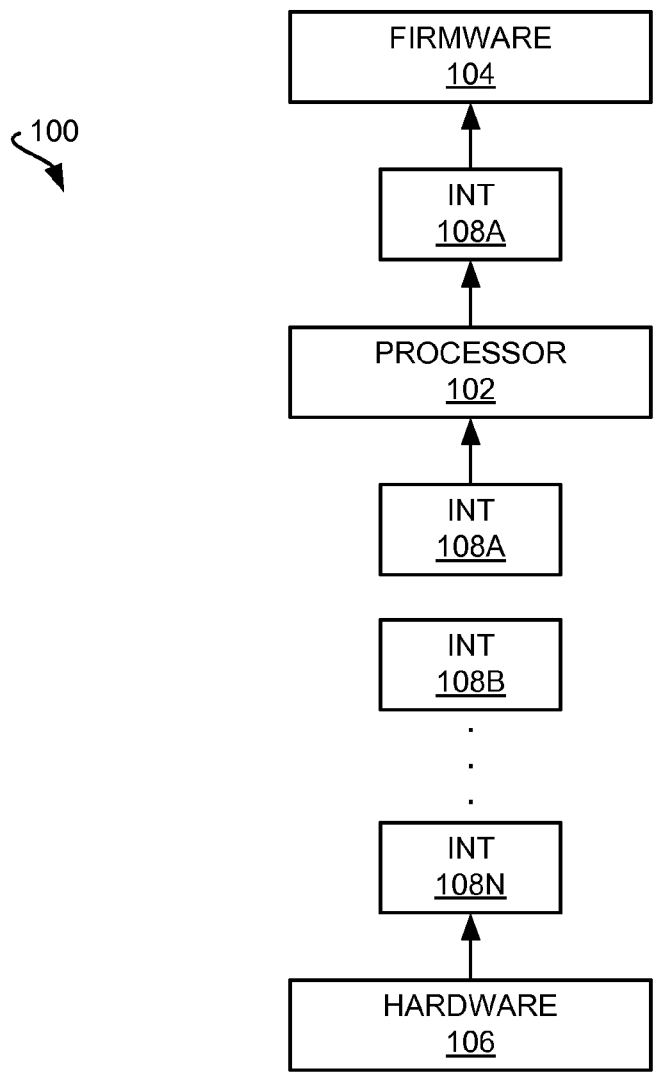
FIG. 1 is a diagram of a computing system in which interrupts of the same type are suppressed by a processor after a first such interrupt is sent from the processor to firmware, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, an interrupt is a signal sent from hardware to a processor when the hardware has detected a condition that requires attention, where the interrupt can take priority over other tasks being executed by the processor. For a system management interrupt (SMI), the processor sends the received SMI to firmware for immediate processing. As one example noted in the background section, a volatile memory controller may send an SMI to the processor when the volatile memory controller detects a correctable or uncorrectable memory error. The processor in turn sends this SMI to the firmware for immediate processing.

For such SMI's relating to memory errors, the firmware determines which memory module in which each memory error has been detected. Typically this involves the firmware comparing information contained within an SMI to each memory module installed within the computing system in question, until the memory module that originated the memory error is located. Some types of computing systems can contain large number of memory modules, such as ninety-six or more memory modules, which may be dual-inline memory modules (DIMM's). As such, it can take time for the firmware to locate the memory module in which the memory error has occurred.

While the firmware is determining which memory module originated a given memory error to which an SMI corresponds, the processor may receive additional SMI's corresponding to memory errors. As such, the processor may send these additional SMI's to the firmware for processing. The computer system in question thus becomes flooded by SMI's. From an end user standpoint, the computing system appears to have locked up, because little if any processor time is being allocated for the operating system and for the computer programs running on the operating system to be executed. Rather, a large majority of the processor time is being spent by the firmware locating the memory module that caused the memory error to which each SMI corresponds. Furthermore, each time the processor enters and exits the firmware, time is spent to restore and save the processor context, respectively.

By comparison, in embodiments of the invention, the processor determines the rate at which interrupts of the same type are being received from hardware, and compares this rate to a threshold rate. If the rate at which interrupts of the same type are being received is greater than the threshold rate, the processor sends just the first received interrupt to the firmware for processing. The other interrupts are not sent to the firmware, but instead are suppressed by the processor. As such, from an end user standpoint, the computing system does not appear to have locked up. This is particularly useful for correctable memory errors, since the point of having memory errors that are correctable is that execution of the computing system does not have to be stopped in light of such errors occurring.

FIG. 1 shows a computing system 100, according to an embodiment of the invention. The system 100 can be implemented as a computing device, such as a computer like a server. The system 100 includes a processor 102, firmware 104, and hardware 106. The firmware 104 may be a basic input/output system (BIOS), and may be stored on a non-volatile memory. The hardware 106 can be or include volatile memory, as well as other types of hardware, such as input/output (I/O) devices.

The hardware 106 generates interrupts 108A, 108B, ..., 108N, collectively referred to as the interrupts 108. The hardware 106 sends the interrupts to the processor 102 as the hardware 106 generates the interrupts. The interrupts can be SMI's that require immediate attention. The interrupts 108 are all of the same type. For example, where the hardware 106 is volatile memory, the SMI's may relate to correctable or uncorrectable memory errors.

The processor 102 determines the rate at which the interrupts 108 are being received. If the rate at which the interrupts 108 are being received at the processor 102 is greater than a threshold rate, then the processor 102 does not send all the interrupts 108 to the firmware 104 for processing by the firmware 104. Rather, as depicted in FIG. 1, the processor 102 sends to the firmware 104 just the first interrupt 108A of the interrupts 108 of the same type that the processor 102 received from the hardware 106. The other interrupts 108 are not sent from the processor 102 to the firmware 104, but rather are suppressed by the processor 102. As such, the computing system 100 is prevented from being flooded by the other interrupts 108.

The firmware 104 receives the interrupt 108A from the processor 102, and processes the interrupt 108A. For example, where the interrupt 108A is an SMI that relates to a correctable memory error, the firmware 104 may locate the memory module in which the memory error occurred. The firmware 104 may then log this information, for later review by an administrator or operator of the computing system 100.

It is noted that higher-level software of the computing system 100 does not receive or participate in the processing of the interrupts 108. The firmware 104, as noted above, is low-level software. By comparison, higher-level software of the computing system 100 can include the operating system running on the system 100, including device drivers, and so on, as well as computer programs running on the operating system. The initial receipt of the interrupts 108 sent from the hardware 106 is by other hardware, namely the processor 102. The processor 102 does not send any interrupt 108 to higher-level software of the computing system 100 in the embodiment of FIG. 1, but rather just sends interrupts 108 to the firmware 104 for processing.

It is further noted that if the rate at which the interrupts 108 are being received at the processor 102 is less than the threshold rate, then the processor 102 sends all the interrupts 108 to the firmware 104. This is in comparison to the scenario in which the rate at which the interrupts 108 are being received at the processor 102 is greater than the threshold rate, where the processor 102 sends just the first received interrupt 108A to the firmware 104. The threshold rate is desirably set to a rate that is equal to or below the rate at which the firmware 104 can process all the interrupts 108 as they are received, while permitting other software running on the computing system 100, such as the operating system and computer programs running thereon, with acceptable degradation of the performance of this other software.

It is also noted that the processor 102 may have a given operating mode in which the rate at which the interrupts 108 are received is compared to a threshold, such that whether all the interrupts 108 are sent to the firmware 104 or only one interrupt 108 is sent to the firmware 104 is controlled by the result of this comparison. The firmware 104, such as pursuant to user command, may control whether the processor 102 operates in this operating mode or not. If the processor 102 operates in the given operating mode, then it sends the interrupts 108 based on their rate of receipt at the processor 102, as described above. If the processor 102 does not operate in this operating mode, however, then the processor 102 may always send all the interrupts 108 to the firmware 104, regardless of their rate of receipt at the processor 102.

FIG. 2 shows a method 200, according to an embodiment of the invention. The processor 102 receives the interrupts 108, which are of the same type, from the hardware 106 (202). The processor 102 determines the rate at which the interrupts 108 are being received (204), and compares this rate to a threshold rate (206). In response to determining that the rate at which the interrupts 108 are being received is greater than the threshold rate, the processor 102 sends just the first received interrupt 108A to the firmware 104 (208). By comparison, in response to determining that this rate is less than the threshold rate, the processor 102 sends all the interrupts to the firmware 104 (210). The firmware 104 thus receives one or more of the interrupts 108 (212), and process them (214).

Figure 3:
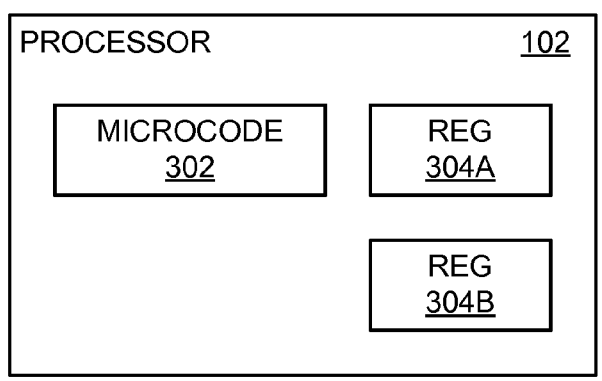
FIG. 3 is a diagram of a processor in which interrupts of the same type are suppressed after a first such interrupt is sent to firmware, according to an embodiment of the invention.

FIG. 3 shows the processor 102 in detail, according to an embodiment of the invention. The processor 102 includes microcode 302, and two registers 304A and 304B, collectively referred to as the registers 304. The microcode 302 implements parts 202, 204, 206, 208, and 210 of the method 200. As such, the microcode 302 can be considered as computer-readable code that is internally executed by the processor 102, and that is stored on a computer-readable storage medium that is part of the processor 102 itself.

The registers 304 store values that can be set by the firmware 104, such as through user command. The register 304A stores a value corresponding to the threshold rate to which the processor 102 compares the rate of receipt of the interrupts 108 in part 206. For example, the register 304A may be a single byte that can store a value between zero and 255. In one embodiment, each such value between zero and 255 may correspond to a different predetermined threshold rate. In another embodiment, the threshold rate may be determined as two to the power of the value stored in the register 304A.

The register 304B stores a value corresponding to whether the processor 102 should operate in the given operational mode in which whether or not just the first received interrupt 108A or all received interrupts 108 of the same type are sent to the firmware 104 is controlled by the rate of receipt of the interrupts 108. For example, the register 304B may be a single bit that can store a logical one or a logical zero. If the value of the register 304B is logical one, then the processor 102 operates in this operational mode. As such, if the rate of receipt of the interrupts 108 is greater than the threshold rate, then just the first received interrupt 108A is sent to the firmware 104, and the other interrupts 108 are suppressed by the processor 102 and not sent to the firmware 104. By comparison, if the value of the register 304B is logical zero, then the processor 102 does not operate in this operational mode. As such, all the interrupts 108 are sent to the firmware 104, regardless of their rate of receipt at the processor 102.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   receiving, by a processor from hardware, a plurality of interrupts of a same type;
   after receiving the plurality of interrupts of the same type, determining, by the processor, a rate at which the interrupts are being received at the processor;
   after determining the rate at which the interrupts are being received, comparing the rate at which the interrupts are being received to a threshold rate;
   after comparing the rate at which the interrupts are being received to the threshold rate, in response to determining that the rate at which the interrupts are being received is greater than the threshold rate,
      sending just a first received interrupt of the interrupts from the processor to firmware for processing by the firmware, such that all other of the interrupts are not sent from the processor to the firmware but instead are suppressed by the processor; and
   after comparing the rate at which the interrupts are being received to the threshold rate, in response to determining that the rate at which the interrupts are being received is less than the threshold rate,
      sending all the interrupts from the processor to the firmware for processing by the firmware,
   wherein none of the interrupts are processed until the plurality of interrupts have been received and the rate at which the interrupts are being received has been determined.

2. The method of claim 1, wherein sending just the first received interrupt from the processor to the firmware prevents flooding by the other interrupts.

3. The method of claim 1, further comprising:
   receiving the interrupt from the processor, by the firmware; and,
   processing the interrupt, by the firmware.

4. The method of claim 1, wherein the interrupt is a system management interrupt (SMI).

5. The method of claim 1, wherein the hardware is a memory, and the interrupt indicates one of a correctable memory error and an uncorrectable memory error.

6. The method of claim 1, wherein the firmware is a basic input/output system (BIOS).

7. A computer program product of a processor comprising:
   a computer-readable storage medium that is part of the processor and that has computer-readable code embodied therein, the computer-readable code internally executable by the processor, the computer-readable code comprising:
      first computer-readable code to receive from hardware a plurality of interrupts of a same type;
      second computer-readable code to, after the first computer-readable code has received the plurality of interrupts of the same type, determine a rate at which the interrupts are being received at the processor;
      third computer-readable code to, after the second computer-readable code has determined the rate at which the interrupts are being received, compare the rate at which the interrupts are being received to a threshold rate;
      fourth computer-readable code to, after the third computer-readable code has compared the rate at which the interrupts are being received to the threshold rate, where the rate at which the interrupts are being received is greater than the threshold rate, send just a first received interrupt of the interrupts from the processor to firmware for processing by the firmware, such that all other of the interrupts are not sent from the processor to the firmware but instead are suppressed by the processor; and
      fifth computer-readable code to, after the third computer-readable code has compared the rate at which the interrupts are being received to the threshold rate, where the rate at which the interrupts are being received is less than the threshold rate, send all the interrupts from the processor to the firmware for processing by the firmware,
   wherein none of the interrupts are processed until the first computer-readable code has received the plurality of interrupts and the second computer-readable code has determined the rate at which the interrupts are being received.

8. The computer program product of claim 7, wherein the fourth computer-readable code sending just the first received interrupt from the processor to the firmware prevents flooding by the other interrupts.

9. The computer program product of claim 7, wherein the interrupt is a system management interrupt (SMI).

10. The computer program product of claim 7, wherein the hardware is a memory, and the interrupt indicates one of a correctable memory error and an uncorrectable memory error.

11. A computing system comprising:
    firmware;
    hardware to generate a plurality of interrupts of a same type; and,
    a processor to receive the interrupts, to after having receiving the plurality of interrupts of the same type determine the rate at which the interrupts are being received, and to after determining the rate at which the interrupts are being received compare the rate at which the interrupts are being received to a threshold rate,
    wherein in a given operational mode, the processor is to, after comparing the rate at which the interrupts are being received to the threshold rate, where the rate at which the interrupts are being received is greater than the threshold rate, send just the first received interrupt of the interrupts to the firmware for processing by the firmware, such that all other of the interrupts are not sent from the processor to the firmware but instead are suppressed by the processor,
    wherein in the given operational mode, the processor is further to, after comparing rate at which the interrupts are being received to the threshold rate, where the rate at which the interrupts are being received is less than the threshold rate, send all the interrupts from the processor to the firmware for processing by the firmware, and wherein none of the interrupts are processed until the plurality of interrupts have been received and the rate at which the interrupts are being received has been determined.

12. The computing system of claim 11, wherein the processor sending just the first received interrupt from the processor to the firmware prevents the computing system from being flooded by the other interrupts.

13. The computing system of claim 11, wherein the processor comprises a register to store a firmware-settable value corresponding to the threshold rate.

14. The computing system of claim 11, wherein the processor comprises a register to store a firmware-settable flag corresponding to whether the processor should operate in the given operational mode.

15. The computing system of claim 11, wherein the interrupt is a system management interrupt (SMI).

16. The computing system of claim 11, wherein the hardware is a memory, and the interrupt indicates one of a correctable memory error and an uncorrectable memory error.

17. The computing system of claim 11, wherein the firmware is a basic input/output system (BIOS).

* * * * *